(12) United States Patent
Davis et al.

(10) Patent No.: US 8,087,864 B2
(45) Date of Patent: Jan. 3, 2012

(54) MOLDED PIN FOR COUPLING TWO OR MORE MEMBERS

(75) Inventors: Gerald H. Davis, Fountain City, IN (US); Gary L. Cox, Richmond, IN (US); Chad L. Eversole, Richmond, IN (US)

(73) Assignee: Vandor Corporation, Richmond, IN (US)

(*) Notice: Subject to any disclaimer, the term of this patent is extended or adjusted under 35 U.S.C. 154(b) by 270 days.

(21) Appl. No.: 12/288,721

(22) Filed: Oct. 22, 2008

(65) Prior Publication Data

US 2009/0120333 A1 May 14, 2009

Related U.S. Application Data

(60) Provisional application No. 60/999,910, filed on Oct. 22, 2007.

(51) Int. Cl.
*F16B 19/00* (2006.01)
(52) U.S. Cl. ......................................... 411/354; 411/355
(58) Field of Classification Search .......... 411/354–356; 403/374.1, 408.1, 409.1; 24/453; 292/343; 249/196
See application file for complete search history.

(56) References Cited

U.S. PATENT DOCUMENTS

| | | | | |
|---|---|---|---|---|
| 1,385,001 A * | 7/1921 | Hackett | | 411/354 |
| 1,407,893 A * | 2/1922 | Smith | | 411/354 |
| 1,430,238 A * | 9/1922 | La Borde | | 411/355 |
| 1,519,308 A * | 12/1924 | Hood | | 411/354 |
| 1,931,421 A * | 10/1933 | Weidlich | | 292/343 |
| 1,990,234 A * | 2/1935 | Kemper | | 249/217 |
| 2,034,266 A * | 3/1936 | Moore et al. | | 411/354 |
| 2,238,856 A * | 4/1941 | Churchill | | 24/581.11 |
| 3,837,625 A * | 9/1974 | Loov | | 254/104 |
| 4,401,291 A * | 8/1983 | Gallis | | 249/196 |
| 6,311,537 B1 * | 11/2001 | Vigil | | 72/392 |
| 7,506,905 B1 * | 3/2009 | George | | 292/343 |

* cited by examiner

*Primary Examiner* — Gary Estremsky
(74) *Attorney, Agent, or Firm* — Maginot, Moore & Beck

(57) ABSTRACT

A connecting pin includes a head and a body having a first end connected to the head. The body includes an underside having at least one surface arranged on a first plane parallel to a longitudinal direction. The body also includes a nose at a second end, the nose having an lower surface that extends upwardly and outwardly from the body underside. The body further includes an inclined surface extending to from an upper surface of the nose in the direction of the head.

6 Claims, 4 Drawing Sheets

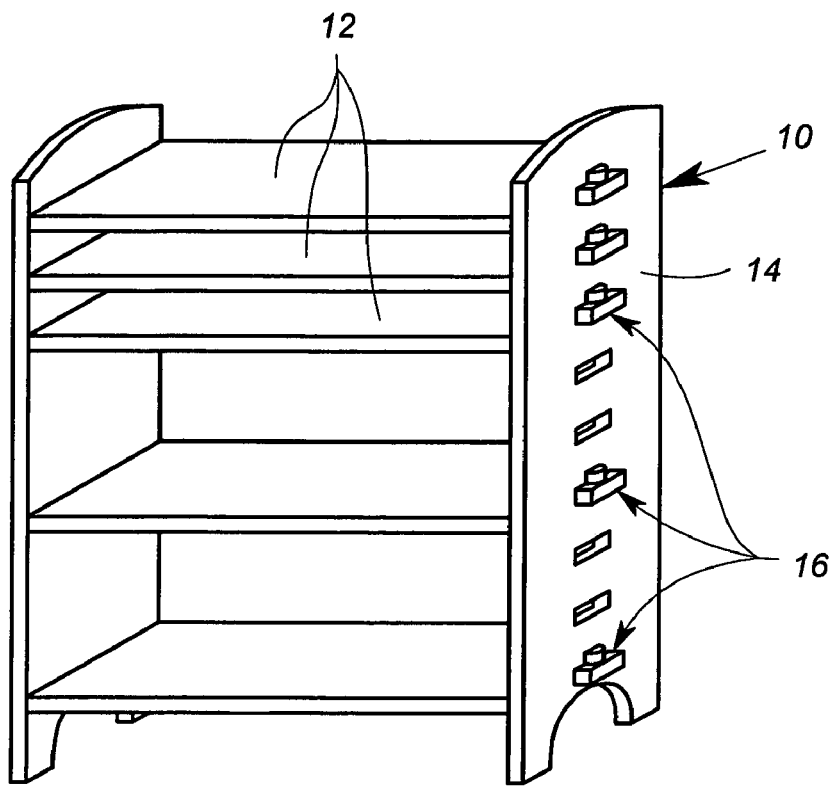
FIG. 1
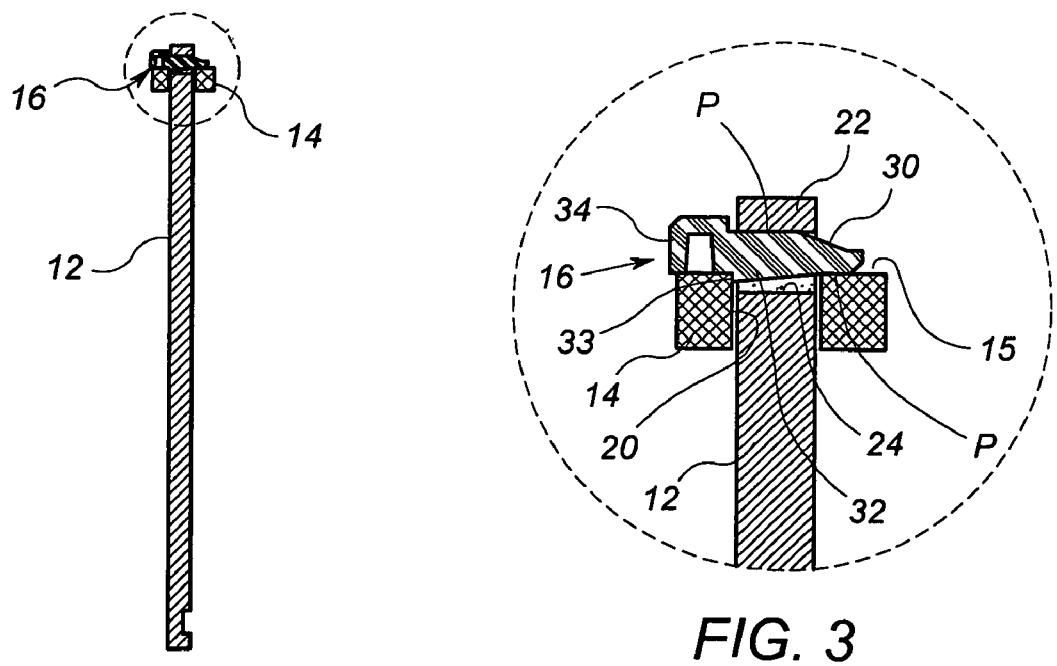
FIG. 2
FIG. 3

MOLDED PIN FOR COUPLING TWO OR MORE MEMBERS

This application claims the benefit of U.S. Provisional Patent Application Ser. No. 60/999,910, filed Oct. 22, 2007.

BACKGROUND

The present invention relates to a device or pin for coupling interlocked members. The invention has particular application in the construction of ready-to-assemble or quickly assembled structures, and particular items that incorporate interlocking members.

Ready-to-assemble structures are easy to construct, often without tools. Structures of this type are often favored because they are relatively inexpensive to make and purchase and therefore provide a low-cost alternative to other more involved constructions. Ready-to-assemble (or RTA) structures have been developed that are durable and strong enough to survive a significant time under normal use. Another benefit of RTA structures is that they can often be disassembled for transport and then re-constructed at a new location.

One common application of RTA technology is as furniture or shelving, such as the shelf unit shown in FIG. 1. RTA furniture is especially useful in children's rooms or college dormitories because it is inexpensive yet durable. Another use of RTA technology has been in the construction of lower cost caskets. One such casket is disclosed in pending application Ser. No. 10/898,552, entitled "Mortise and Tenon Casket" and published as U.S. 2005/0138782 on Jun. 30, 2005, the disclosure of which is incorporated herein by reference. This application discloses a low cost casket that retains much of the strength and beauty of more expensive natural wood caskets. In one embodiment disclosed in the '552 Application, a mortise and tenon joint construction is used to interlock components of the casket. This joint construction employs a tab extending from one component, such as a bottom panel, that projects through a slot formed in another component, such as a side panel of the casket. The tab defines a hole through which a pin is inserted to fix or interlock the tab to the side panel. An example of this mortise and tenon casket is shown in FIG. 8.

This mortise and tenon joint construction is particularly useful for RTA structures because the resulting joint is very firm and stable. This joint construction is also easy to implement in a wide range of materials, such as wood, plastic or metal since the machining required for the interlocked components involves forming a hole in one component and a slot in another.

SUMMARY OF INVENTIVE FEATURES

The present invention thus provides several exemplary inventive features which are included in various embodiments thereof. In particular, at least some embodiments of the present invention contemplate a molded pin for use in a mortise and tenon or similar interlocking joint construction. In one embodiment, the molded pin is adapted to be substantially permanently interlocked within the joint to lock two members together. In this embodiment, the pin includes an integral locking barb that extends from a planar lower surface of the pin and that is adapted to be fixed within the joint. In a mortise and tenon joint construction, the locking barb is configured to engage within the slot of one member while the pin extends through a hole in the other member.

A first embodiment is a connecting pin that includes a head and a body having a first end connected to the head. The body includes an underside having at least one surface arranged on a first plane parallel to a longitudinal direction. The body also includes a nose at a second end, the nose having a lower surface that extends upwardly and outwardly from the body underside. The body further includes an inclined surface extending to from an upper surface of the nose in the direction of the head.

In a further exemplary feature of some embodiments of the invention, the molded pin includes a nose that defines curved or angled surfaces adapted to facilitate insertion of the pin into the joint. In another feature, these cured or angled surfaces may also be configured to exert pressure between the two members being interlocked, resulting in a very solid, substantially rigid interlocking connection.

In another feature of some embodiments the invention, a molded pin is provided for temporary engagement within an interlocking joint, such as a mortise and tenon joint. In this feature, the temporary pin includes a head with features for manually gripping the pin to remove it from the joint. An indentation is defined in the pin adjacent the head that may be accessed by a prying tool, such as a common writing pen. The tip of the prying tool may be engaged within the indentation to pry the pin a sufficient amount to permit access to the manual gripping features on the head of the pin.

In the illustrated embodiment, the pins 30 and 50 were shown interlocking a mortise and tenon joint in an article of shelving, with the pins locking horizontal shelf panels to vertical support panels. As described above, the pins 30 and 50 may also be used to lock the mortise and tenon joints of the low cost casket illustrated in FIG. 8. It is contemplated that the pins 30 and 50 of the present invention may be used to couple a wide range of members and with a wide range of interlocking joint constructions. Thus while the pin 30 is especially well-suited for a mortise and tenon joint construction, as shown in FIG. 3, it may be adapted for use in other interlocking joints.

BRIEF DESCRIPTION OF THE DRAWINGS

FIG. 1 shows perspective view of an exemplary a shelf unit that implements an embodiment of the present invention;

FIG. 2 shows a side cutaway view of a portion of the shelf unit of FIG. 1 showing a first mortise and tenon connection arrangement;

FIG. 3 shows a side fragmentary cutaway view of the first mortise and tenon connection of FIG. 2 and which employs a first embodiment of a connecting pin in accordance with the invention;

DESCRIPTION OF THE PREFERRED EMBODIMENTS

Figure 4E:
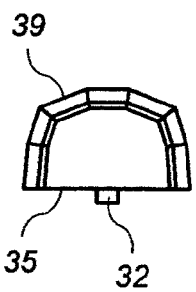
FIGS. 4(*a*)-4(*i*) show multiple views of the first embodiment of the connecting pin of FIG. 3
Figure 4A:
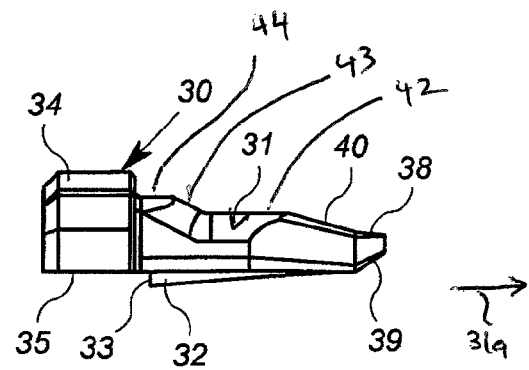
Figure 4F:

The present invention concerns a molded pin for use in mortise and tenon joint constructions. In one embodiment the pin is constructed as a permanent, non-removable pin, while in another the pin is temporary and removable. The molded pin may suitably have uses in constructions other than mortise and tenon constructions.

FIG. 1 shows a first environment in which molded pins in accordance with the present invention may be employed. As depicted in FIG. 1, a shelf unit 10 may include a series of shelf panels 12 supported by at least two vertical panels 14. A joint 16 is formed between each shelf panel and each vertical panel to hold the assembly together. As shown in the detail view of FIG. 3, this joint is a mortise and tenon joint construction. The vertical panel 14 defines a slot 20 that receives a tab 22 extending from an edge of the shelf panel. The tab 22 defines an opening 24. As depicted in FIG. 3, the opening 24 is oriented so that a portion of the opening is outside the slot 20 while another portion is situated within the slot.

In accordance with the disclosed embodiment, a pin 30 extends through the opening 24 in the tab 22. The pin has a length sufficient to span the width of the slot 20 in the side panel so that it bears directly on the side panel 14 on either side of the tab 22. The pin 30 includes an enlarged head 34 at one end that prevents the pin from passing completely through the opening 24.

Details of the pin 30 are best seen in FIGS. 4(a)-4(i). In particular, the pin 30 is preferably a unitary body 31, and most preferably a molded body. In a specific embodiment, the unitary body 30 is formed of a plastic material that is inexpensively and easily molded to include the features of the pin described herein. The body 31 defines the enlarged head 34 with a generally planar underside 35 that bears against the vertical panel 14, as shown in FIG. 3. In one feature of the invention, the body 31 further defines a locking barb 32 that projects at an angle from the planar underside 35. The locking barb 32 is particularly configured to extend into the slot 20, as shown in FIG. 3, to lock the pin in place within the tab opening 24. The locking barb 32 is preferably resiliently deformable so that the barb can pass through the space between the tab opening 24 and the outer face of the vertical panel. Once the pin 30 has been advanced far enough into the opening, the barb reaches the slot and engages the slot wall.

Figure 4B:
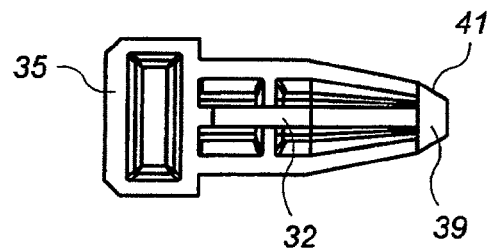
Figure 4G:
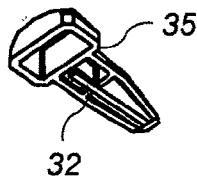
Figure 4C:
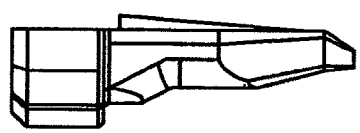
Figure 4H:
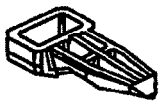
Figure 4I:
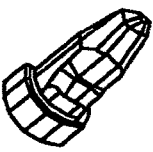
Figure 4D:
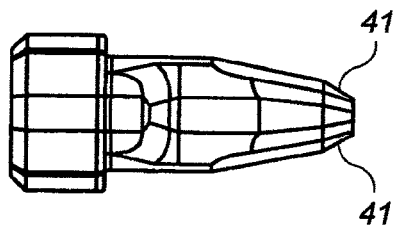
Figure 5:
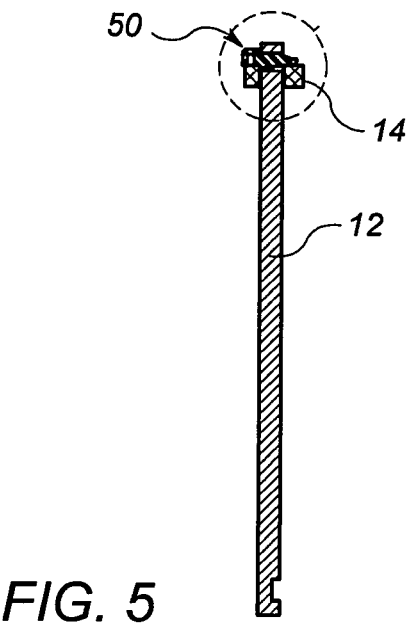
FIG. 5 shows a side cutaway view of a portion of the shelf unit of FIG. 1 showing a second mortise and tenon connection arrangement.

In the illustrated embodiment, the locking barb 32 is in the form of an angled rib, as depicted in FIGS. 4(b), 4(e) and 4(g). The rib is integrally molded with the body 31. As shown in FIGS. 4(a)-(i), the body 31 is molded to define a series of cavities to reduce the amount of material required to form the pin 30, and to facilitate elastic deformation. Alternatively the body 31 may be molded as a solid body.

The body 31 of the pin 30 includes an inclined upper surface 40 and a nose 38 at an end opposite the head 34. An underside 35 of the pin 30 (both the head 34 and the body 31) defines at least one surface arranged on a first plane parallel to a longitudinal direction 31a. The nose is configured to facilitate passage of the pin into the hole 24 in tab 22 and to generate pressure on the locking barb as it locks in place within the slot 20. Thus, in one embodiment, the nose 38 defines an angled or curved lower face 39 that angles upward from the underside 35 of the pin. This angled lower face 39 facilitates entry of the nose 38 into the exposed portion of the tab opening 24. The nose 38 may also include a lateral angled face 41 (FIG. 41(d)) that helps guide the pin into the slot opening 24. The inclined upper surface 40 is angled with respect to the longitudinal plane and is angled differently than an upper surface of the nose) so that the nose 38 and upper surface 40 assume the general shape of a pry bar. Thus, as the pin 30 is advanced farther into the opening 24, the inclined upper surface 40 contacts the tab 22 of the opening 24 (See FIG. 3). If the shelf 12 and panel 14 have some relative fit resiliency, further movement of the pin through the opening 24 essentially pries the tab 22 outward relative to outer surface 15 of the vertical panel 14. The body 31 further includes a middle portion 42, a further inclined portion 43, and an end portion 44. The middle portion 42 has an upper side, the upper side having a relatively uniform cross-section through a length extending from a first middle portion end proximate the inclined upper surface 40 to an opposing second end of the middle portion 42. The further inclined portion 43 is disposed between the second end of the middle portion 42 and the head 30. The end portion 44 is disposed between the further inclined portion 43 and the head 30.

As the pin is pushed through the tab opening, the lower face 39 contacts the vertical panel 14 at the opposite edge of the slot 20. The angle or curvature of this lower face helps guide the nose 38 through the tab opening so that the lower face 39 bears against the outer surface 15 of the panel. At this point, the angled barb 32 also contacts the opposite edge of the slot 20 so that further advancement of the pin 30 through the opening 24 tends to pry the tab 22 even more. This prying action continues until the trailing edge 33 of the barb 32 reaches the slot 20. The pin 30 is then locked within the opening 24 of the tab 22 with pressure primarily applied to the vertical panel 14 and shelf panel 12 at points P depicted in FIG. 3.

It can thus be appreciated that the pin 30 provides a substantially permanent lock for the mortise and tenon joint between the panels 12 and 14. The construction of the pin ensures a very tight lock as the curved or angled surfaces tend to pry apart the tab 22 from the outer surface 15 of the vertical panel 14. The pressure points P maintain firm pressure on the pin to prevent the angled barb 32 from being dislodged from the slot 20 and tab opening 24. All of this functionality may be advantageously provided by a molded plastic pin that is especially molded to reduce material. It can also be appreciated that forming the pin of plastic provide a low friction surface that makes facilitates manually driving the pin through opening into its locking engagement.

Figure 6:
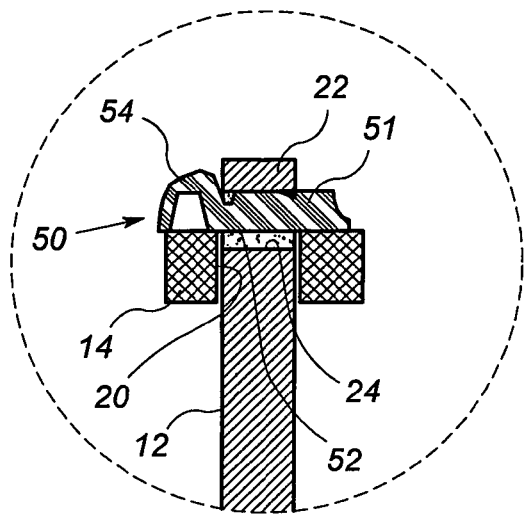
FIG. 6 shows a side fragmentary cutaway view of the second mortise and tenon connection of FIG. 5 and which employs a second embodiment of a connecting pin in accordance with the invention.

In some cases, a permanent pin, such as pin 30, is not required for assembly of an RTA structure. In another embodiment of the invention, a temporary pin 50 is also provided that may engage the same mortise and tenon joint construction described above. As shown in FIG. 6, the pin 50 includes a body 51 that is preferably molded in a plastic material like the pin 30. The body 51 defines a planar underside 52 that extends along the entire length of the pin. Thus, unlike the pin 30, the pin 50 does not include an interlocking feature like the angled barb 32.

Figure 7A:
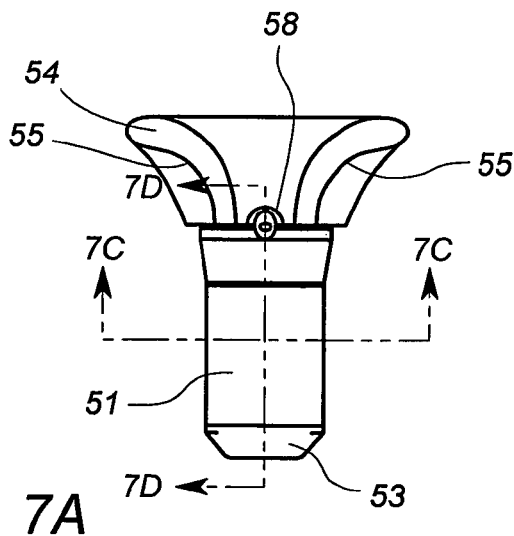
FIGS. 7(*a*)-7(*e*) show multiple views of the second embodiment of the connecting pin of FIG. 6.
Figure 7D:
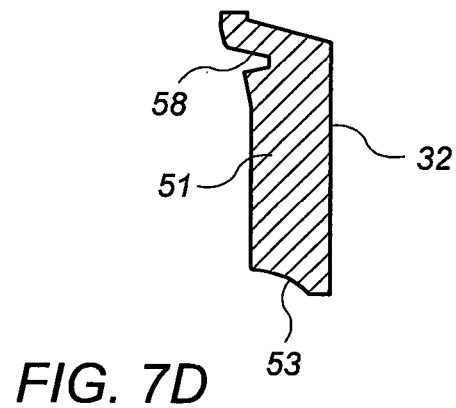
Figure 7B:
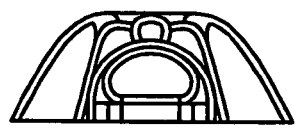
Figure 7E:
Figure 7C:
Figure 8:
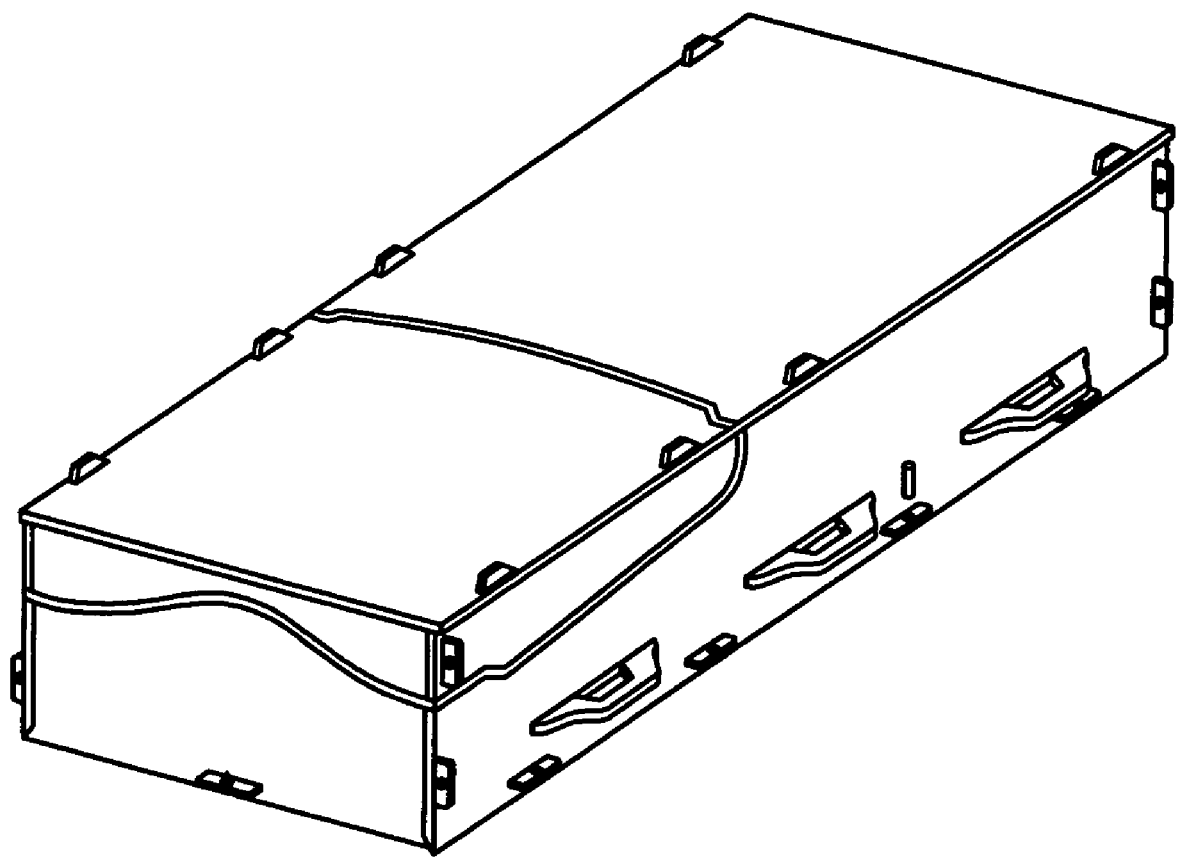
FIG. 8 shows an exemplary embodiment of a casket that employs mortise and tenon connection arrangements in accordance with one or more embodiments of the invention.

The nose 53 of the body 51 may be angled or curved, as shown in FIGS. 6 and 7(d) to facilitate insertion of the pin 50 into the tab opening 24. The body 51 further defines an enlarged head 54 to act as a stop as the pin is inserted through the tab opening. As shown in FIG. 6, the head 54 is preferably hollow to reduce the material required for molding the pin. Moreover, as shown in FIG. 7(a), the head 54 defines finger grips 55 on opposite sides of the head. These finger grips are contoured to receive the tips of a person's fingers so that the pin 50 may be grasped for removal.

It can be appreciated that the pin 50 is preferably formed with a generally low profile, meaning that it does not extend too far beyond the tab slot 23. Thus, the head 54 is also preferably configured for a low profile, which means that the finger grips 55 are positioned very close to the tab 22 when the pin 50 is fully inserted into the opening 24, as illustrated in FIG. 6. In this position, the finger grips 55 are hard to manually engage. Thus, in one feature of the illustrated embodiment, the body 51 further defines a notch or indentation 58 at least partially formed in the head 54. In particular, the indentation 58 is positioned so that at least a portion of the indentation is accessible even when the pin 50 is fully inserted into the tab hole. The indentation 58 is configured to receive the tip of a lever. In one embodiment, the lever may be a common writing pen, for instance, or some other common item adapted to be inserted into the indentation. The tip of the pen may be pressed into the indentation 58 and the pen used as a lever to dislodge the head 54 of the pin away from the tab 22. Once the head has been moved sufficiently far from the tab 22, the finger grips 55 are then available to be manually grasped. The pin 50 may then be pulled out of the opening 24.

We claim:

1. A connecting pin, comprising:
   a head;
   a body having a first end connected to the head, the body including an underside having at least one surface arranged on a first plane parallel to a longitudinal direction, the body including a nose at a second end, the nose having an lower surface that extends upwardly and outwardly from the body underside, the body further including an inclined surface extending to from an upper surface of the nose in the direction of the head,
   further comprising a barb extending radially outward from the underside.

2. The connecting pin of claim 1, wherein a top surface of the body has less width than a width of the underside.

3. The connecting pin of claim 2 wherein the body further comprises:
   a middle portion having an upper side, the upper side having a relatively uniform cross-section through a length extending from proximate the inclined surface to an opposing end;
   a further inclined portion disposed between the end of the middle portion and the head.

4. The connecting pin of claim 3, wherein the body further comprises an end portion disposed between the further inclined portion and the head, the end portion having a relatively uniform cross-section throughout a length.

5. A connecting pin, comprising:
   a head;
   a body having a first end connected to the head, the body including an underside having at least one surface arranged on a first plane parallel to a longitudinal direction, the body including a nose at a second end, the nose having an lower surface that extends upwardly and outwardly from the body underside, the body further including an inclined surface extending to from an upper surface of the nose in the direction of the head;
   wherein the body further comprises:
   a middle portion having an upper side, the upper side having a relatively uniform cross-section through a length extending from proximate the inclined surface to an opposing end;
   a further inclined portion disposed between the end of the middle portion and the head.

6. The connecting pin of claim 5, wherein the body further comprises an end portion disposed between the further inclined portion and the head, the end portion having a relatively uniform cross-section throughout a length.

* * * * *